United States Patent Office 2,992,199
Patented July 11, 1961

2,992,199
DESTATICIZED VINYL-TYPE RESINS
Myron A. Coler, 56 Secor Road, Scarsdale, N.Y.; Janice A. Cutler, 25—14 31st Ave., Long Island City, N.Y.; and Arnold S. Louis, Riverdale, N.Y. (87 Southgate Ave., Hastings-on-Hudson, N.Y.)
No Drawing. Filed Sept. 4, 1958, Ser. No. 758,897
6 Claims. (Cl. 260—23)

This invention relates to improved molding compositions, to methods of molding same and to the improved articles resulting therefrom. More particularly it relates to vinyl-type resin compositions which are distinguished by improved molding properties and are further characterized by a significantly diminished tendency to accumulate an electrostatic charge during manufacture or use of articles from such compositions.

In brief, it has been found that the incorporation of limited amounts of specified alkanol amines and metallic soaps in polystyrene or other vinyl-type resin materials produced articles with the desired combination of properties, and particularly with improved electrostatic properties.

One of the problems confronting manufacturers, molders and users of molded plastics is the collection of dust on the surfaces of molded articles, especially articles of polystyrene or polystyrene based compositions. The dust is tenaciously held on upper, side and lower surfaces of the article by an electrostatic field, usually produced during the molding operation and particularly during ejection of the article from the mold.

The electrostatic field appears to be not only a surface phenomena, but also to be distributed throughout the entire volume of the molded article. Consequently prior art conventional treatments of the surface alone are of very limited value, since the field created is not merely on the surface. One specific advantage of the present invention is the elimination of such prior art separate treatment to destaticize finished plastic articles.

Although the electrostatic field is weakened with time, it may persist for months and even years. Hence the ultimate user is confronted with dust accumulation problems originating at the time of molding and persisting despite the interim use of protective wrappings.

Moldings often appear particularly "dirty" due to non-uniformity in dust pickup. The pickup tends to be strongest over regions of thin cross-section and high curvature and in recessed areas which are particularly difficult to reach and to clean.

Many treatments have been proposed to alleviate the problem, but such solutions have met with but limited success. Because of the inadequacy of treatments directed only to the surface, those skilled in the art have sought with little or no success to disperse a destaticizing material throughout the volume of the article to be destaticized. A great variety of destaticizing agents have been investigated including conductive materials such as metal powders and carbon. Such treatments have only limited applicability because these additives change the color, transparency, plastic flow and other physical properties to such an extent as to destroy the very advantages which distinguish polystyrenes or other clear plastics.

The materials disclosed in earlier applications filed by the present applicants as destaticizing agents compatible with plastics produced by polymerization of vinyl-type monomers include combinations of alkanol amines with carboxylic acids disclosed and claimed in copending application Serial No. 679,098. Although articles produced from such materials exhibit electrostatic properties far superior to those produced from articles incorporating either of the added materials, the use of carboxylic acids is accompanied by the necessity for closely controlling the amount of acid, since the presence of excessive amounts of free acid tends to weaken or destroy the beneficial destaticized properties and to yellow the moldings.

In order to produce an antistatic plastic characterized by a high degree of extrudability we have found it advantageous to incorporate limited amounts of combinations of alkanolamines and metallic soaps in molding compositions of vinyl-type resins.

The expression "vinyl-type resins" as herein employed is intended to include all polymers formed by the polymerization of monomers having a polymerizable C=C double bond and hence includes vinyls (e.g. polystyrene), vinylidenes (vinylidene chloride) and acrylics (methacrylates), both substituted and unsubstituted and both homopolymers and copolymers and mixtures thereof.

The alkanol amines which have been found suitable include mono-alkanol amines e.g. diethylethanolamine, dimethylethanolamine, dialkanol amines e.g. diethanolamine and diisopropanolamine; substituted dialkanol amines, e.g. N-butyl diethanolamine; trialkanol amines, e.g. triethanolamine, and triisopropanol amine which is particularly preferred. Suitable alkanolamines may be generally represented by the formula

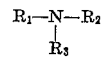

wherein $R_1$ is an alkanol group, with from 2 to 8 carbon atoms and either or both $R_2$ and $R_3$ are alkanol groups with 2 to 8 carbon atoms, or alkyl groups with 1–8 carbon atoms or hydrogen. Formulations may contain one or more of the alkanolamines, provided that the total amount of amine constituent does not exceed the limits which are later described in this application.

The other constituent of our additive is a metallic soap. Suitable metallic soaps are those metallic salts of aliphatic acids having between 4 and 18 and preferably about 9 carbon atoms in the chain and in which the metal is a metal other than an alkali metal. Since colorless soaps are preferred, the metal is preferably one selected from groups II and III of the periodic table. Salts of monobasic and dibasic aliphatic carboxylic acids are suitable in the practice of our invention.

Because the presence of excessive amounts of additive results in finished articles more susceptible to heat distortion, lowering the heat distortion point between about 2 and 4° C., and in finished articles which are undesirably streaked or iridescent, it is important that the total amount of additive be no more than that required to produce destaticized articles. We have found that when combinations of suitable alkanolamines and metallic soaps are employed, the total amount of additive may be held below about 3% of the weight of the resin without loss of the desired properties. In practice, it is preferred to use between 1% and 10% of the additive, based on the weight of the resin and preferably between 1 and 3% for best physical properties.

In the additive, the relative proportions of alkanolamine and metallic soap which may be used extend over a wide range. While we do not wish to be bound by any specific theory, it appears that the presence of as little as 1 carboxyl group in the metallic salt in the mixture for each 9 amine nitrogens in the alkanolamines greatly enhances the effectiveness of the mixture. The relative proportions of metallic soap to alkanolamine should preferably be between 10 carboxylic groups in the soap to 90 amine nitrogens and 70 carboxylic groups in the soap to 30 amine nitrogens in the mixture.

Such mixtures have been found to be particularly effective in destaticizing injection molded articles formed of vinyl-type polymers as above defined. The polymers may be homopolymers, or copolymers, or mixtures containing such polymers. The vinyl-type monomer may be either unsubstituted or alkyl- or halogen substituted. Because the accumulation of electrostatic charge is particularly troublesome in the injection molding of polystyrene, wherein the charge build-up appears to be due in part to the contact potential between the mold and the plastic during filling of the mold cavity and particularly during stripping of the article from the mold, we have described preferred embodiments of our invention in reference compositions based on polystyrene, but it is to be understood that this is by way of illustration and not by way of limitation.

EXAMPLE 145.6 grams of tri-isopropanol amine was mixed with 36.4 grams of zinc pelargonate in a Waring Blendor (8:2 ratio). The mixture was blended with polystyrene (Monsanto Lustrex L2020) in a sigma blade mixer, a white pigment being added, namely $TiO_2$, the addition of which is optional. The additive constituted 2% by weight of the resin. The resulting mixture was then extruded and injection molded on a Van Dorn injection molder Model No. 1, using a 400° F. feed barrel temperature with a water cooled mold. A dwell time of about 10 seconds was used. Moldings were tested immediately after ejection by means of a Keithly Voltmeter and by means of lamp-black blown from a spray gun. The moldings gave a dust pattern rated as 8–9 on an arbitrary basis as compared with dust patterns rated 18–20 for polystyrene to which 2% tri-isopropanol amine had been added; lower ratings mean less dust.

Other compositions were molded and tested with results as indicated in the following table:

Table

[All parts by weight]

| Polymer | Amine | Soap | Electrostatic Rating, v. |
|---|---|---|---|
| Copolymer of 10% butadiene and 90% styrene (98). | Triethanol amine (1). | Zinc caprylate (1). | −1 |
| Polystyrene (98). | Tri-isopropanol amine (1.6). | Zinc pelargonate (0.4). | −0.5 |
| Polystyrene (99). | Di-isopropanol amine (0.5). | Calcium butyrate (0.5). | +2.0 |
| Poly α-methyl-styrene (97). | N-butyl di-ethanol amine (2.4). | Calcium laurate (0.6). | −0.8 |
| Polyethylene (99). | Tri-isopropanol amine (0.8). | Aluminum stearate (0.2). | −1.0 |
| Polyethylene (98). | Di-methyliso-propanol amine (1.0). | Magnesium oleate (1.0). | 0 |
| Copolymer of 25% acrylonitrile, 75% styrene (98). | Diethanolamine (1.6). | Zinc caproate (0.4). | +0.5 |
| Polyvinyl chloride (97). | N-butyl diethanol amine (2). | Lead palmitate (1). | −0.2 |
| Polyvinyl chloride (90). | Tri-isopropanol amine (5). | Calcium stearate (5). | 0 |
| Polymethylmethacrylate (99). | Diethanolamine (0.8). | Calcium caprylate (0.2). | −3 |
| Polymethylmethacrylate (98). | Hexyl-diethanol amine (1). | Zinc caproate (1). | 0.5 |
| Polyvinylidene chloride (99). | N-ethyl bis(2 ethyl hexanol 4) amine (0.8). | Zinc pelargonate (0.2). | 1.5 |
| Polyvinylidene chloride (98). | Dimethyl isopropanol amine (1.6). | Calcium succinate (0.4). | 3 |
| Polystyrene (100). | None. | None. | 20 |

The additives of the present invention may be incorporated in larger amounts than those illustrated in the foregoing example, where it is advantageous to produce and market concentrates containing far more additive than is likely to be useful in a molding composition. Such concentrates may be later blended with additional resin to produce the desired molding composition. Concentrates or "master batches" may contain up to about 33% of the additive without any noticeable impairment of its effectiveness in subsequently diluted compositions.

It will be understood by others skilled in the art that the compositions of the present invention may also include fillers, dyes or other coloring matter and such additives as are commonly employed to facilitate the use of resins in molding processes, e.g. plasticizers, or the like, without departure from the intended scope of our invention as defined in the following claims.

We claim:
1. A composition consisting essentially of a resin polymer of a vinylidene monomer destaticized by the addition thereto of up to 10% by weight of both (1) alkanol amine represented by

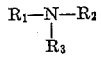

wherein $R_1$ is alkanol with 2 to 8 carbons and $R_2$ and $R_3$ are each selected from the group consisting of alkanol with 2 to 8 carbons, alkyl with 1 to 8 carbons and hydrogen; and (2) metallic soap of the group consisting of the metallic salts of aliphatic mono- and di- carboxylic acids with from 4 to 18 carbons in the chain and a metal selected from the group consisting of metals of groups II and III of the periodic table.

2. The composition of claim 1 wherein the relative proportion of amine to soap is such that there are between about one and twenty-one carboxyl groups in the soap for each nine amine nitrogens in the alkanolamine.

3. A destaticized injection molded article consisting of the composition of claim 1.

4. A molded polystyrene article containing a destaticizing additive compound of triisopropanol amine and zinc pelargonate.

5. A composition of matter consisting essentially of polystyrene containing between 1% and 10% by weight of triisopropanol amine and zinc perlargonate.

6. The composition of claim 1 wherein the polymer is polystyrene.

References Cited in the file of this patent

UNITED STATES PATENTS

| | | |
|---|---|---|
| 1,966,856 | Groff | July 17, 1934 |
| 2,013,941 | Young et al. | Sept. 10, 1935 |
| 2,103,581 | Gray | Dec. 28, 1937 |
| 2,557,474 | Sanderson | June 19, 1951 |
| 2,711,401 | Lally | June 21, 1955 |
| 2,772,967 | Padbury | Dec. 4, 1956 |
| 2,773,852 | Rowe | Dec. 11, 1956 |

UNITED STATES PATENT OFFICE
CERTIFICATE OF CORRECTION

Patent No. 2,992,199                        July 11, 1961

Myron A. Coler et al.

It is hereby certified that error appears in the above numbered patent requiring correction and that the said Letters Patent should read as corrected below.

Column 4, line 43, for "compound" read -- composed --; line 47, for perlargonate" read -- pelargonate --.

Signed and sealed this 21st day of November 1961.

(SEAL)
Attest:

ERNEST W. SWIDER
Attesting Officer

DAVID L. LADD
Commissioner of Patents

USCOMM-DC